(12) United States Patent
Hotelling (10) Patent No.: US 8,487,898 B2
(45) Date of Patent: Jul. 16, 2013

(54) GROUND GUARD FOR CAPACITIVE SENSING

(75) Inventor: Steve Porter Hotelling, San Jose, CA (US)

(73) Assignee: Apple Inc., Cupertino, CA (US)

(*) Notice: Subject to any disclaimer, the term of this patent is extended or adjusted under 35 U.S.C. 154(b) by 921 days.

(21) Appl. No.: 12/110,024

(22) Filed: Apr. 25, 2008

(65) Prior Publication Data

US 2009/0267916 A1  Oct. 29, 2009

(51) Int. Cl.
*G06F 3/045* (2006.01)

(52) U.S. Cl.
USPC ............................................ 345/174; 345/173

(58) Field of Classification Search
USPC ................... 345/173–174; 341/33
See application file for complete search history.

(56) References Cited

U.S. PATENT DOCUMENTS

| | | |
|---|---|---|
| 4,304,976 A | 12/1981 | Gottbreht et al. |
| 4,659,874 A | 4/1987 | Landmeier |
| 5,194,862 A | 3/1993 | Edwards et al. |
| 5,317,919 A | 6/1994 | Awtrey |
| 5,459,463 A | 10/1995 | Gruaz et al. |
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,129,935 B2 | 10/2006 | Mackey |
| 7,138,686 B1 | 11/2006 | Banerjee et al. |
| 7,184,064 B2 | 2/2007 | Zimmerman et al. |
| 7,538,760 B2 | 5/2009 | Hotelling et al. |
| 7,663,607 B2 | 2/2010 | Hotelling et al. |
| 8,223,133 B2 | 7/2012 | Hristov |
| 8,319,747 B2 | 11/2012 | Hotelling et al. |
| 2004/0017362 A1 | 1/2004 | Mulligan et al. |
| 2004/0090429 A1 | 5/2004 | Geaghan et al. |

(Continued)

FOREIGN PATENT DOCUMENTS

| | | |
|---|---|---|
| CN | 1672119 A | 9/2005 |
| CN | 1711520 A | 12/2005 |

(Continued)

OTHER PUBLICATIONS

International Search Report mailed Aug. 5, 2009, for PCT Application No. PCT/US2009/041465, filed Apr. 22, 2009, four pages.

(Continued)

*Primary Examiner* — Christopher E Leiby
(74) *Attorney, Agent, or Firm* — Morrison & Foerster LLP (57) ABSTRACT

A touch sensor panel is disclosed including the use of ground guards or ground isolation bars to improve the touch event detection capabilities of the touch sensor panel. Ground isolation bars can be formed between connecting traces and adjacent sense lines to shunt near-field lines to ground and reduce unwanted capacitive coupling between the connecting traces and the sense lines. Ground guards can be formed between the drive and sense lines to partially or fully surround a sense line and shunt near-field lines to ground and improve the touch event detection capabilities of the sensor.

12 Claims, 10 Drawing Sheets

U.S. PATENT DOCUMENTS

| | | | |
|---|---|---|---|
| 2004/0239650 A1* | 12/2004 | Mackey | 345/174 |
| 2005/0073507 A1 | 4/2005 | Richter et al. | |
| 2005/0083307 A1 | 4/2005 | Aufderheide et al. | |
| 2005/0146509 A1 | 7/2005 | Geaghan et al. | |
| 2005/0270039 A1 | 12/2005 | Mackey | |
| 2006/0026521 A1 | 2/2006 | Hotelling et al. | |
| 2006/0038791 A1 | 2/2006 | Mackey | |
| 2006/0097991 A1* | 5/2006 | Hotelling et al. | 345/173 |
| 2006/0132463 A1 | 6/2006 | Lee et al. | |
| 2006/0146484 A1 | 7/2006 | Kim et al. | |
| 2006/0197753 A1 | 9/2006 | Hotelling | |
| 2007/0008299 A1 | 1/2007 | Hristov | |
| 2007/0074914 A1 | 4/2007 | Geaghan et al. | |
| 2007/0229468 A1* | 10/2007 | Peng et al. | 345/173 |
| 2007/0247443 A1 | 10/2007 | Philipp | |
| 2007/0279395 A1 | 12/2007 | Philipp | |
| 2008/0074398 A1 | 3/2008 | Wright | |
| 2008/0158181 A1 | 7/2008 | Hamblin et al. | |
| 2008/0264699 A1 | 10/2008 | Chang et al. | |
| 2008/0277259 A1 | 11/2008 | Chang | |
| 2008/0309633 A1 | 12/2008 | Hotelling et al. | |
| 2008/0309635 A1 | 12/2008 | Matsuo | |
| 2009/0002337 A1 | 1/2009 | Chang | |
| 2009/0019344 A1 | 1/2009 | Yoon et al. | |
| 2009/0054107 A1* | 2/2009 | Feland et al. | 455/564 |
| 2009/0091551 A1 | 4/2009 | Hotelling et al. | |
| 2009/0236151 A1 | 9/2009 | Yeh et al. | |
| 2009/0242283 A1 | 10/2009 | Chiu | |
| 2009/0267902 A1 | 10/2009 | Nambu et al. | |
| 2009/0309850 A1 | 12/2009 | Yang | |
| 2009/0314621 A1 | 12/2009 | Hotelling | |
| 2009/0315854 A1 | 12/2009 | Matsuoo | |
| 2010/0149108 A1 | 6/2010 | Hotelling et al. | |
| 2011/0007020 A1 | 1/2011 | Hong | |

FOREIGN PATENT DOCUMENTS

| | | |
|---|---|---|
| CN | 1782837 A | 6/2006 |
| CN | 1818842 A | 8/2006 |
| CN | 1864124 A | 11/2006 |
| CN | 1945516 A | 4/2007 |
| CN | 101046720 A | 10/2007 |
| CN | 101071354 A | 11/2007 |
| DE | 11 2008 001 245 T5 | 3/2010 |
| EP | 0 853 230 A1 | 7/1998 |
| EP | 1 192 585 A1 | 4/2002 |
| EP | 1 192 585 B1 | 4/2002 |
| EP | 1 573 706 A2 | 9/2005 |
| EP | 1 573 706 A3 | 9/2005 |
| EP | 1 644 918 A2 | 4/2006 |
| EP | 2 077 489 A1 | 7/2009 |
| GB | 1 546 317 A | 5/1979 |
| GB | 2 144 146 A | 2/1985 |
| GB | 2 428 306 A | 1/2007 |
| GB | 2 437 827 A | 11/2007 |
| JP | 2000-163031 A | 6/2000 |
| JP | 2002-342033 A | 11/2002 |
| JP | 2004-503835 A | 2/2004 |
| JP | 2005-084128 A | 3/2005 |
| JP | 2007-018515 A | 1/2007 |
| JP | 2008-510251 A | 4/2008 |
| TW | M344522 | 11/2008 |
| TW | M344544 | 11/2008 |
| WO | WO-01/097204 A1 | 12/2001 |
| WO | WO-2005/114369 A2 | 12/2005 |
| WO | WO-2005/114369 A3 | 12/2005 |
| WO | WO-2006/023147 A2 | 3/2006 |
| WO | WO-2006/023147 A3 | 3/2006 |
| WO | WO-2006/104745 A2 | 10/2006 |
| WO | WO-2006/104745 A3 | 10/2006 |
| WO | WO-2006/130584 A2 | 12/2006 |
| WO | WO-2006/130584 A3 | 12/2006 |
| WO | WO-2007/034591 A1 | 3/2007 |
| WO | WO-2007/146785 A2 | 12/2007 |
| WO | WO-2007/146785 A3 | 12/2007 |
| WO | WO-2008/007118 A2 | 1/2008 |
| WO | WO-2008/007118 A3 | 1/2008 |
| WO | WO-2008/108514 A1 | 9/2008 |
| WO | WO-2008/135713 A1 | 11/2008 |
| WO | WO-2009/046363 A1 | 4/2009 |
| WO | WO-2009/132146 A1 | 10/2009 |
| WO | WO-2009/132150 A1 | 10/2009 |
| WO | WO-2010/117882 A2 | 10/2010 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Chinese Search Report completed Jun. 3, 2011, for CN Patent Application No. ZL2009201524013, with English Translation, 20 pages.

Cassidy, R. (Feb. 23, 2007). "The Tissot T-Touch Watch—A Groundbreaking Timepiece," located at <http://ezinearticles.com/?The-Tissot-T-Touch-Watch---A-Groundbreaking-Timepiece&id . . . >, last visited Jan. 23, 2009, two pages.

Chinese Search Report mailed Jan. 7, 2011, for CN Application No. 2009200081997, filed Apr. 24, 2009, with English Translation, 14 pages.

Chinese Search Report mailed Jan. 10, 2011, for CN Application No. 2008201338142, filed Sep. 27, 2008, with English Translation, 25 pages.

European Search Report mailed Mar. 19, 2009, for EP Application No. 08017396.6, filed Oct. 8, 2008, seven pages.

Final Office Action mailed Jun. 8, 2011, for U.S. Appl. No. 12/038,760, filed Feb. 27, 2008, 20 pages.

Final Office Action mailed Dec. 15, 2011, for U.S. Appl. No. 12/333,250, filed Dec. 11, 2008, 12 pages.

Final Office Action mailed Aug. 31, 2012, for U.S. Appl. No. 12/110,075, filed Apr. 25, 2008, 15 pages.

Great Britain Search Report mailed Jan. 19, 2009, for GB Application No. GB0817242.1, filed Sep. 22, 2008, two pages.

Great Britain Search Report mailed Jan. 19, 2010, for GB Application No. GB0817242.1, filed Sep. 22, 2008, two pages.

International Search Report mailed on Mar. 19, 2009, for PCT Application No. PCT/US2008/078836, filed on Oct. 3, 2008, four pages.

International Search Report mailed Jul. 17, 2009, for PCT Application No. PCT/US2009/041460, three pages.

International Search Report mailed Jan. 14, 2011, for PCT Application No. PCT/US2010/029698, filed Apr. 1, 2010, 5 pages.

Non-Final Office Action mailed Feb. 4, 2011, for U.S. Appl. No. 12/038,760, filed Feb. 27, 2008, 18 pages.

Non-Final Office Action mailed Jul. 8, 2011, for U.S. Appl. No. 12/110,075, filed Apr. 25, 2008, 14 pages.

Non-Final Office Action mailed Aug. 17, 2011, for U.S. Appl. No. 12/333,250, filed Dec. 11, 2008, 12 pages.

Non-Final Office Action mailed Jan. 25, 2012, for U.S. Appl. No. 12/110,075, filed Apr. 25, 2008, 21 pages.

Non-Final Office Action mailed Jun. 7, 2012, for U.S. Appl. No. 12/500,911, filed Jul. 10, 2009, 16 pages.

Notice of Allowance mailed Aug. 28, 2012, for U.S. Appl. No. 12/333,250, filed Dec. 11, 2008, nine pages.

* cited by examiner

GROUND GUARD FOR CAPACITIVE SENSING

FIELD OF THE INVENTION

This relates generally to input devices for computing systems, and more particularly, to improving the touch detection capability of a capacitive touch sensor panel.

BACKGROUND OF THE INVENTION

Many types of input devices are presently available for performing operations in a computing system, such as buttons or keys, mice, trackballs, touch sensor panels, joysticks, touch screens and the like. Touch screens, in particular, are becoming increasingly popular because of their ease and versatility of operation as well as their declining price. Touch screens can include a touch sensor panel, which can be a clear panel with a touch-sensitive surface. The touch sensor panel can be positioned in front of a display screen so that the touch-sensitive surface covers the viewable area of the display screen. Touch screens can allow a user to make selections and move a cursor by simply touching the display screen via a finger or stylus. In general, the touch screen can recognize the touch and position of the touch on the display screen, and the computing system can interpret the touch and thereafter perform an action based on the touch event.

Touch sensor panels can be implemented as an array of pixels formed by multiple drive lines (e.g. rows) crossing over multiple sense lines (e.g. columns), where the drive and sense lines are separated by a dielectric material. In some touch sensor panels, the row and column lines can be formed on a single side of a substrate. In such touch sensor panels, both near and far electric field lines are coupled between the row and column lines of each pixel, with some of the far-field lines passing through and temporarily exiting the cover glass protecting the drive and sense lines. A finger or other object touching down on or near the touch sensor panel can shunt those exiting far-field lines to ground and effect a change in the capacitance of the pixel that can be detected as a touch event. However, because most of the electric field lines are not capable of being shunted by the finger, the signal-to-noise ratio (SNR) is limited, and the touch event detection capabilities of the pixel are reduced.

SUMMARY OF THE INVENTION

This relates to a touch sensor panel having an array of touch sensors fabricated on a single side of a substrate for detecting single or multi-touch events (the touching of one or multiple fingers or other objects upon a touch-sensitive surface at distinct locations at about the same time), and the use of ground guards or ground isolation bars to improve the touch event detection capabilities of the touch sensor panel. Each sensor or pixel can be the result of interactions between drive and sense lines. The sense (or drive) lines can be fabricated as columnar or zig-zag patterns in a first orientation, and the drive (or sense) lines can be fabricated as rows of polygonal (e.g. brick-shaped or pentagonal) conductive areas in a second orientation. The polygonal areas representing a particular drive line can be coupled together by connecting traces that are routed to a particular bus line formed in the border areas of the touch sensor panel.

Ground isolation bars, which are formed from conductive material and are tied to ground or another reference voltage, can be formed between connecting traces and adjacent sense lines to shunt near-field lines to ground and reduce unwanted capacitive coupling between the connecting traces and the sense lines. Ground guards, which are also formed from conductive material and tied to ground or another reference voltage, can be formed between the drive and sense lines to partially or fully surround a sense line and shunt near-field lines to ground and improve the touch event detection capabilities of the sensor.

One benefit of using a ground guard is improving the touch event detection capabilities of the touch sensor panel. A ground guard can reduce the undesirable mutual capacitance between the drive and sense lines by shunting most near field lines directly to ground instead of allowing them to couple to a sense line, leaving mostly far field lines affected by touch events. With mostly far field lines affecting the mutual capacitance value, the change in capacitance during a touch event can approach 50%, which represents an improved SNR.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

This relates to a touch sensor panel having an array of touch sensors fabricated on a single side of a substrate for detecting single or multi-touch events (the touching of one or multiple fingers or other objects upon a touch-sensitive surface at distinct locations at about the same time), and the use of ground guards or ground isolation bars to improve the touch event detection capabilities of the touch sensor panel. Each sensor or pixel can be the result of interactions between drive and sense lines. The sense (or drive) lines can be fabricated as columnar or zig-zag patterns in a first orientation, and the drive (or sense) lines can be fabricated as rows of polygonal (e.g. brick-shaped or pentagonal) conductive areas in a second orientation. The polygonal areas representing a particular drive line can be coupled together by connecting traces that are routed to a particular bus line formed in the border areas of the touch sensor panel.

Ground isolation bars, which are formed from conductive material and are tied to ground or another reference voltage, can be formed between connecting traces and adjacent sense lines to shunt near-field lines to ground and reduce unwanted capacitive coupling between the connecting traces and the sense lines. Ground guards, which are also formed from conductive material and tied to ground or another reference voltage, can be formed between the drive and sense lines to partially or fully surround a sense line and shunt near-field lines to ground and improve the touch event detection capabilities of the sensor.

Although the touch sensors in the sensor panel may be described and illustrated herein in terms of generally orthogonal arrangements of drive lines formed as rows of rectangular bricks or pentagonal shapes, and sense lines formed as columnar or zig-zag patterns, embodiments of this invention are not so limited, but can be additionally applicable to polygonal areas of other shapes and sense lines formed in other patterns.

Figure 1A:
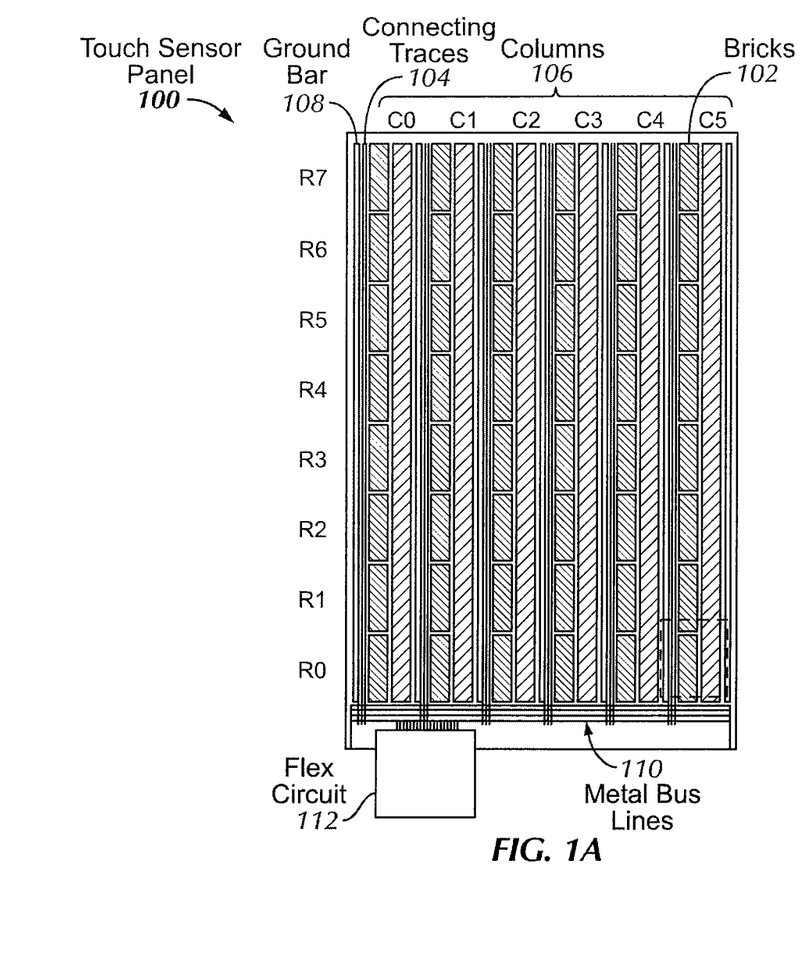
FIG. 1a illustrates an exemplary touch sensor panel including columns, rows of bricks, and connecting traces routed along only one side of the bricks according to embodiments of the invention.

FIG. 1a illustrates exemplary touch sensor panel 100 including sense (or drive) lines (C0-C5) formed as columns 106 and rows of polygonal areas (bricks) 102, where each row of bricks forms a separate drive (or sense) line (R0-R7) according to embodiments of the invention. In the example of FIG. 1a, connecting traces 104 are routed along only one side of the bricks (a so-called "single escape" configuration). Although a touch sensor panel 100 having six columns and eight rows is shown, it should be understood that any number of columns and rows can be employed. Columns 106 and bricks 102 of FIG. 1a can be formed in a co-planar single layer of conductive material.

To couple bricks 102 in a particular row together, connecting traces 104, which are also formed from a conductive material, can be routed from the bricks along one side of the bricks in a single escape configuration to a particular bus line 110. Ground isolation bars 108, which are formed from conductive material, can be formed between connecting traces 104 and adjacent columns 106 to reduce the capacitive coupling between the connecting traces and the columns. Connections for each bus line 110 and for columns 106 can be brought off touch sensor panel 100 through flex circuit 112. In touch screen embodiments, the sense lines, drive lines, connecting traces and ground isolation bars can be formed from a substantially transparent material such as Indium Tin Oxide (ITO), although other materials can also be used. The ITO layer can be formed on a single layer on either on the back of a coverglass or on a separate substrate.

Figure 1B:
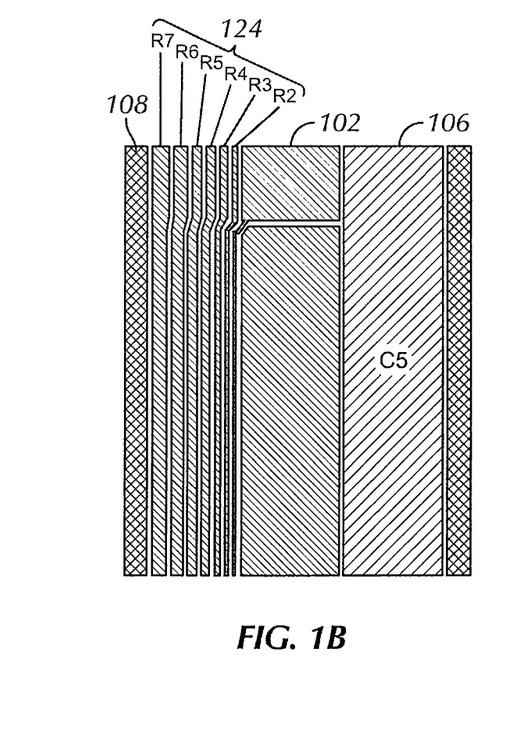
FIG. 1b illustrates a close-up view of a portion of the exemplary touch sensor panel of FIG. 1a, showing bricks routed to bus lines using connecting traces in a single escape configuration according to embodiments of the invention.

FIG. 1b illustrates a close-up view of a portion of the exemplary touch sensor panel 100 of FIG. 1a, showing how bricks 102 can be routed to bus lines 110 using connecting traces 104 in a single escape configuration according to embodiments of the invention. In FIG. 1b, the longer connecting traces 104 (e.g. trace R7) can be wider than the shorter connecting traces (e.g. trace R2) to equalize the overall resistivity of the traces and to minimize the overall capacitive loads seen by the drive circuitry.

Figure 1C:
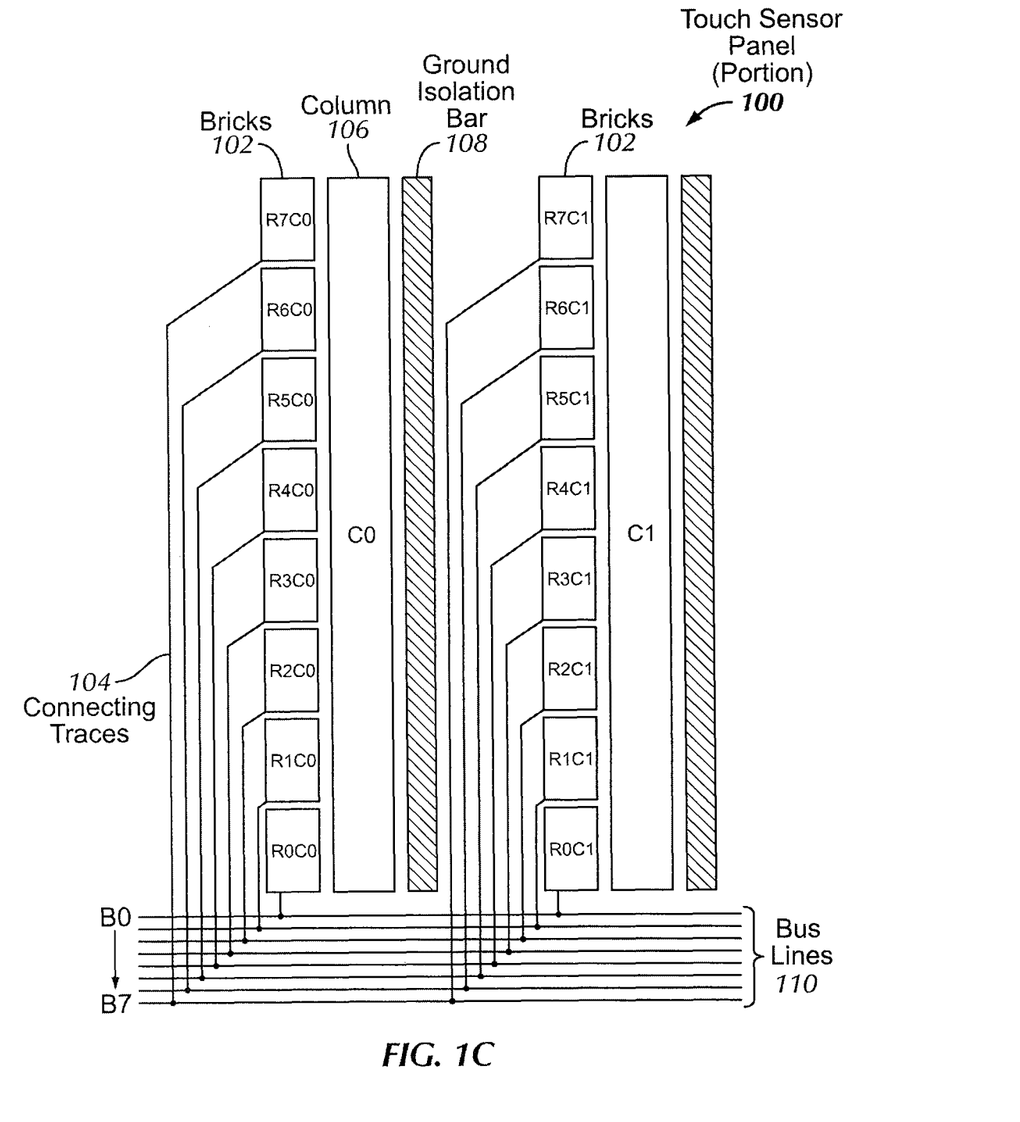
FIG. 1c illustrates a portion of the exemplary touch sensor panel of FIG. 1a, including bricks associated with columns C0 and C1 and connecting traces coupling the bricks to the bus lines according to embodiments of the invention.

FIG. 1c illustrates a portion of exemplary touch sensor panel 100 of FIG. 1a including bricks 102 associated with columns C0 and C1 and connecting traces 104 (illustrated symbolically as thin lines) coupling the bricks to bus lines 110 according to embodiments of the invention. In the example of FIG. 1b, which is drawn in a symbolic manner and not to scale for purposes of illustration only, bus line B0 is coupled to brick R0C0 (the closest brick to B0 adjacent to column C0) and R0C1 (the closest brick to B0 adjacent to column C1). Bus line B1 is coupled to brick R1C0 (the next closest brick to B0 adjacent to column C0) and R1C1 (the next closest brick to B0 adjacent to column C1). The pattern repeats for the other bus lines such that bus line B7 is coupled to brick R7C0 (the farthest brick from B0 adjacent to column C0) and R7C1 (the farthest brick from B0 adjacent to column C1).

Figure 2A:
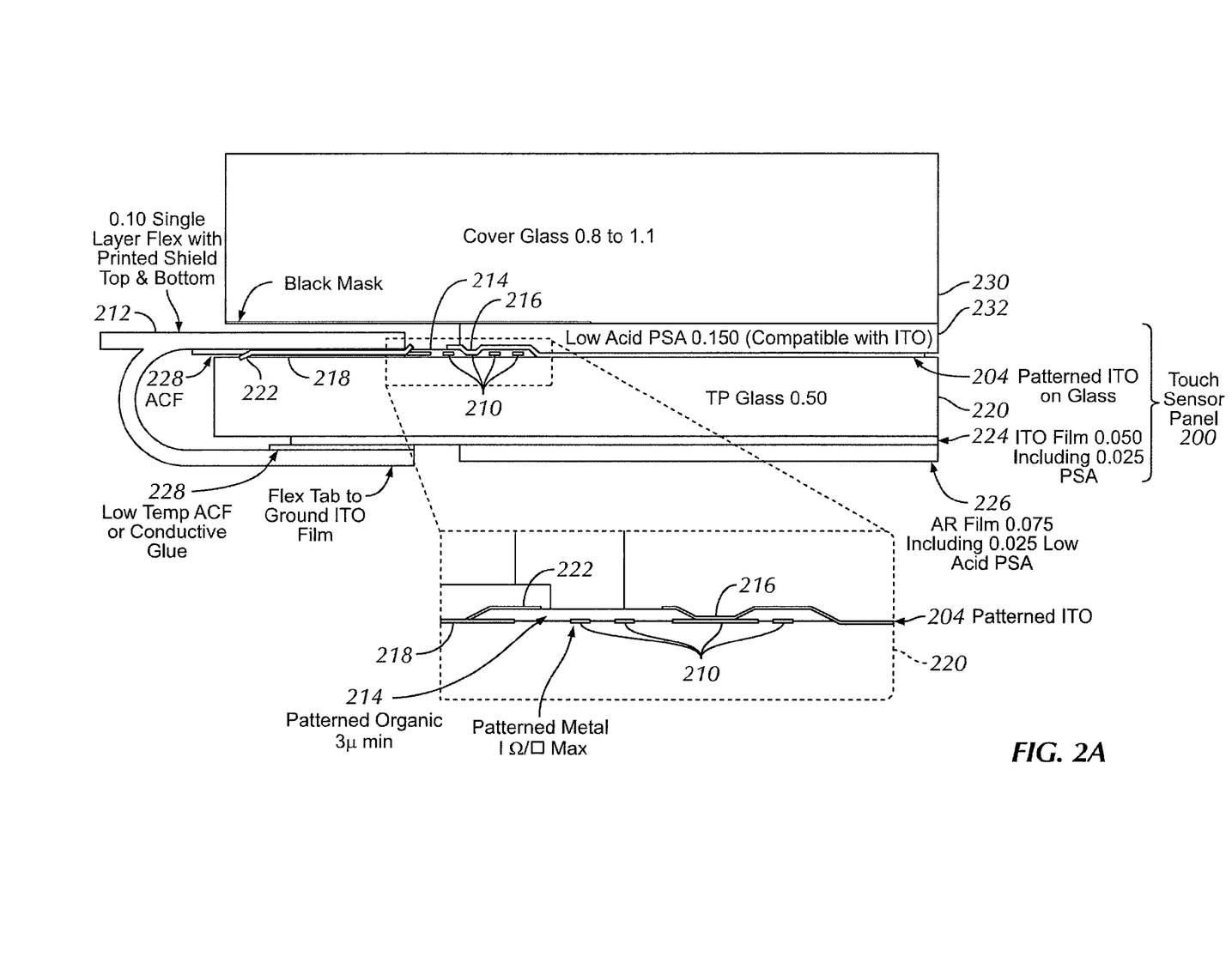
FIG. 2a illustrates a side view of a portion of an exemplary touch sensor panel showing the connections between connecting traces and bus lines according to embodiments of the invention.

FIG. 2a illustrates a side view of a portion of exemplary touch sensor panel 200 showing the coupling between connecting traces 204 and bus lines 210 according to embodiments of the invention. In FIG. 2a, bus lines 210 and pads 218 (e.g. metal having a resistance of 1 ohm per square maximum) can be formed on substrate 220 (e.g. glass having a thickness of 500 microns±50 microns). Insulating layer 214 (e.g. organic polymer having a thickness of 3 microns minimum) can then be formed over bus lines 210 and pads 218 and patterned to create vias 216. Connecting traces 204 can then be formed over insulating layer 214 and into vias 216 to make connections between the traces and bus lines 210. In addition, the same conductive material used to form connecting traces 204 can also be partially formed over pads 218 at location 222 to protect the pads. On the back side of substrate 220, conductive shield layer 224 (e.g. ITO having a thickness of 50 microns±10 microns) can be formed over substrate 220 to shield the sense lines (not shown in FIG. 2a). Anti-reflective (AR) film 226 having a particular thickness (e.g. 75 microns±15 microns) can then be affixed to shield layer 224 using an adhesive such as a 25 micron layer of PSA. Flex circuit 212 can be attached to both the top and bottom of touch sensor panel 200 using an adhesive 228 (e.g. anisotropic conductive film (ACF)) capable of forming conductive bonds. Finally, touch sensor panel 200 can be bonded to cover material 230 (e.g. glass having a thickness of 800 to 1100 microns) using adhesive 232 (e.g. low-acid pressure sensitive adhesive (PSA) having a thickness of 150 microns±25 microns).

Figure 2B:
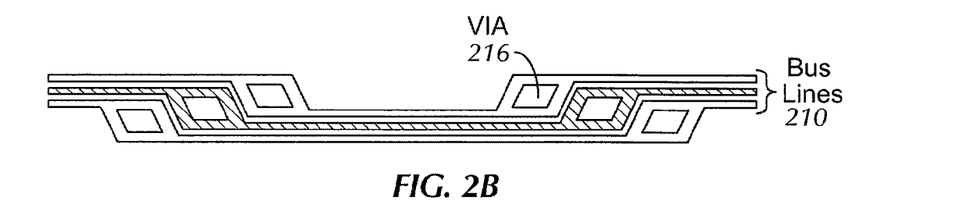
FIG. 2b illustrates a top view of a portion of the exemplary bus lines of FIG. 2a according to embodiments of the invention.

FIG. 2b illustrates a top view of a portion of the exemplary bus lines 210 of FIG. 2a according to embodiments of the invention. Note that in the example of FIG. 2b, the top bus line is wider (e.g. 100 microns) at the point at which via 216 provides for a connection between bus line 210 and a connecting trace.

Referring again to the example of FIG. 1c, because bus line B0 has much shorter connecting traces 104 to bricks R0C0 and R0C1 as compared to bus line B7 (and its connecting traces to bricks R7C0 and R7C1), the impedance and capacitance of bus line B7 can be much greater than that of bus line B0. Because of this imbalance, touch measurements for a given amount of touch may not be equalized across the touch sensor panel. Therefore, in some embodiments of the invention, the bricks coupled to a particular bus line can be interleaved so that each bus line sees a more uniform average impedance and capacitance, which can help equalize touch measurements across the touch sensor panel.

Figure 3:
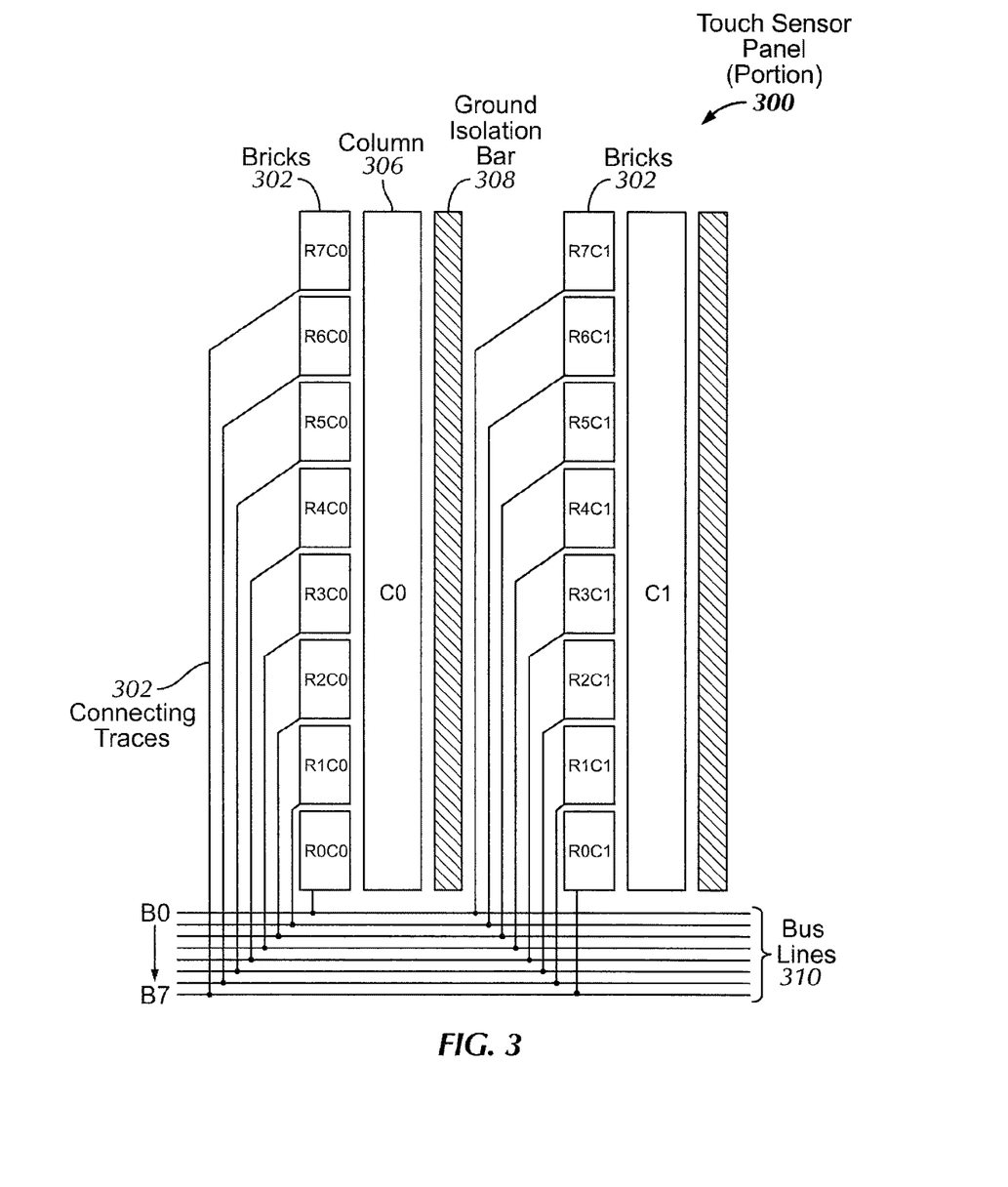
FIG. 3 illustrates a portion of an exemplary touch sensor panel including rows of bricks whose connecting traces are interleaved according to embodiments of the invention.

FIG. 3 illustrates a portion of exemplary touch sensor panel 300 including drive (or sense) lines formed as bricks 302 whose connecting traces 304 are interleaved according to embodiments of the invention. In the example of FIG. 3, which is drawn in a symbolic manner and not to scale for purposes of clarity, bus line B0 is coupled to brick R0C0 (the closest brick to B0 adjacent to column C0) and R7C1 (the farthest brick from B0 adjacent to column C1). Bus line B1 is coupled to brick R1C0 (the next closest brick to B0 adjacent to column C0) and R6C1 (the next farthest brick from B0 adjacent to column C1). This coupling pattern repeats for the other bus lines, as evidenced by bus line B7 coupled to brick R7C0 (the farthest brick from B0 adjacent to column C0) and R0C1 (the closest brick to B0 adjacent to column C1). By interleaving the bricks coupled to any particular bus line as described above, each bus line sees a more uniform average impedance and capacitance, which can help equalize touch measurements across the touch sensor panel. However, it should be understood that with this arrangement, for a given bus line, the location of the bricks being stimulated can vary greatly. Nevertheless, post-processing of the resultant touch image can identify the actual touch locations.

Interleaving can additionally provide increased power uniformity. Without interleaving, some drivers can have a small capacitive load, while others can have a large capacitive load. To ensure that the largest load can be properly driven, all drivers may be designed to drive the largest capacitive load, resulting in higher current requirements for all drivers, even those not driven with a large load. However, with interleaving, each driver can have a more moderate and roughly equivalent capacitive load, and the drivers need only be designed to drive the moderate capacitive load.

Figure 4A:
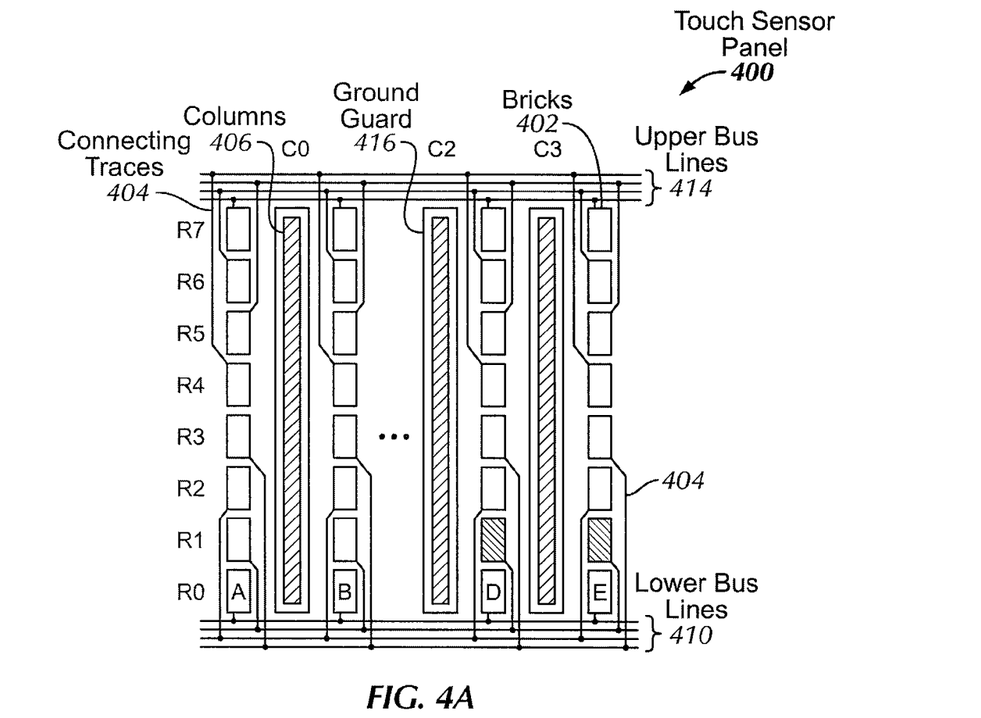
FIG. 4a illustrates an exemplary touch sensor panel including columns, rows of bricks, and connecting traces routed along both sides of the bricks according to embodiments of the invention.

FIG. 4a illustrates exemplary touch sensor panel 400 including sense (or drive) lines formed as columns 406, drive (or sense) lines formed as rows of bricks 402, and connecting traces 404 (illustrated symbolically as thin lines) routed along both sides of the bricks (a so-called "double escape" configuration) according to embodiments of the invention. In the example of FIG. 4a, sense (or drive) lines (C0-C3) can be formed as columns 406 and drive (or sense) lines (R0-R7) can be formed as rows of bricks 402, where each row of bricks forms a separate drive (or sense) line. Although a touch sensor panel 400 having four columns and eight rows is shown, it should be understood that any number of columns and rows can be employed. Columns 406 and bricks 402 of FIG. 4a can be formed in a co-planar single layer of conductive material.

To couple bricks 402 in a particular row together, connecting traces 404, which are also formed from a conductive material, can be routed from the bricks along alternating sides of the bricks in a double escape configuration to a particular lower bus line 410 or upper bus line 414 (although it should be understood that in other embodiments, only a single group of bus lines at either the top or bottom may be employed). Ground guards 416, which are formed from conductive material, can be formed between connecting traces 404 and adjacent columns 406. Lower bus lines 410 and upper bus lines 414, as well as connecting traces for columns 406, can be routed along the border areas and brought off touch sensor panel 400 through a flex circuit.

Figure 4B:
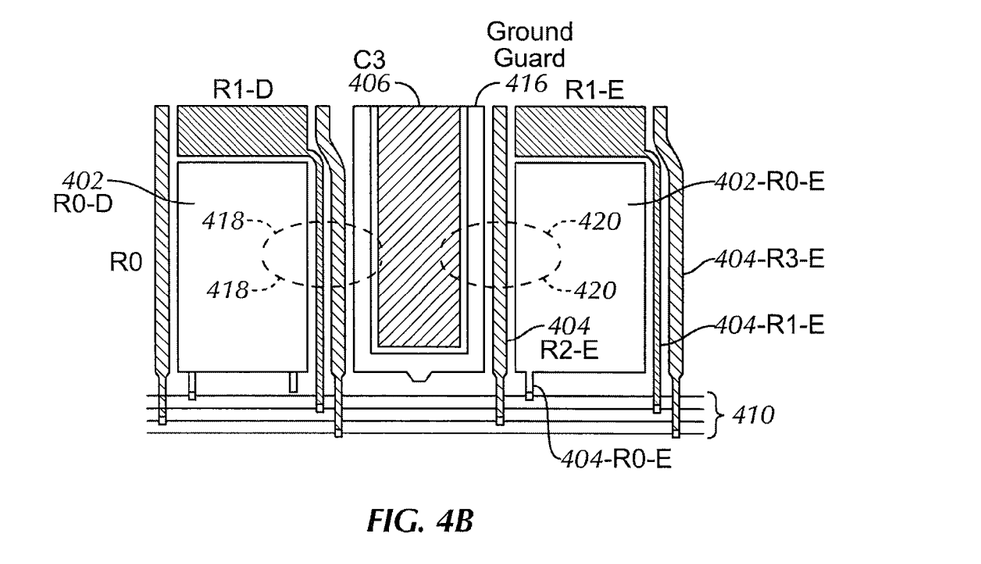
FIG. 4b illustrates a close-up view of a portion of the exemplary touch sensor panel of FIG. 4a, showing bricks routed to lower bus lines using connecting traces in a double escape configuration according to embodiments of the invention.

FIG. 4b illustrates a close-up view of a portion of the exemplary touch sensor panel 400 of FIG. 4a, showing how bricks 402 can be routed to lower bus lines 410 using connecting traces 404 in a double escape configuration according to embodiments of the invention. In the example of FIG. 4b, connecting trace 404-R0-E can be routed directly to lower bus lines 410, connecting trace 404-R1-E can be routed along the right side of brick R0-E, connecting trace 404-R2-E can be routed along the left side of bricks R0-E and R1-E, and connecting trace 404-R3-E can be routed along the right side of bricks R0-E, R1-E and R2-E (not shown) in the double escape configuration.

In the mutual capacitance double escape embodiment of FIG. 4b, each pixel can be characterized by the mutual capacitance between a column and two adjacent bricks. For example, the pixel or sensor for R0-C3 can be formed by mutual capacitance 418 between brick R0-D and C3, and also mutual capacitance 420 between brick R0-E and C3.

As mentioned above, an optional ground guard can be formed around each column in FIGS. 4a and 4b, and can also be formed around each column in FIGS. 1a, 1b, 1c and 3. In one embodiment, the columns can be around 1000 microns wide, and the ground guard can be around 250 microns wide. One benefit of using a ground guard is improving the touch event detection capabilities of the touch sensor panel.

Figure 5A:
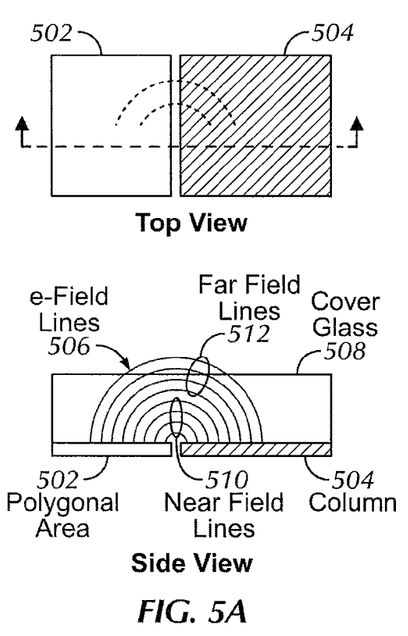
FIGS. 5a and 5b illustrate top and side views of the effect of an exemplary ground guard on electric field lines emanating from a polygonal area of conductive material according to embodiments of the invention.
Figure 5B:
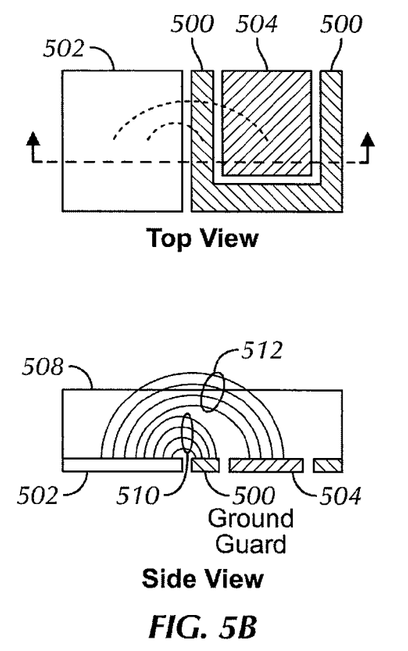

FIGS. 5a and 5b illustrate top and side views of the effect of exemplary ground guard 500 on polygonal area of conductive material 502 according to embodiments of the invention.

FIG. 5a illustrates an example without a ground guard. When either polygonal area of conductive material 502 or column 504 is driven by a stimulation signal, fringing electric field lines 506 appear between the polygonal area and column 504. As the side view illustrates, some electric field lines can temporarily exit cover glass 508 in the process. Electric field lines 506 include near field lines 510, which generally do not exit cover glass 508 and are therefore largely unaffected by a finger appearing on or in proximity to the cover glass. For example, near field lines 510 may generate a stray capacitance, Csig, of about 2.4 pF, but the change in the stray capacitance during a touch event, ΔCsig, may be only about 0.05 pf, which is a small change of about 2%. Electric field lines 506 also include far field lines 512, some of which can temporarily exit cover glass 506 and can be blocked by a finger. In contrast to near field lines 510, far field lines 512 may generate Csig of about 0.6 pF, but experience a change in the stray capacitance during a touch event, ΔCsig, of about 0.3 pF, which is a much larger change of about 50%. This large change represents a better signal-to-noise ratio (SNR) and improved touch event detection.

However, because both near and far field lines 510 and 512 are present when either polygonal conductive area 502 or column 504 is being stimulated, the total Csig being generated in the example above is about 3.0 pF and the total change in the stray capacitance ΔCsig during a touch event is about 0.35 pf, which represents only about a 10% change. To maximize the percentage change in stray capacitance during a touch event, it is desirable to minimize the amount of mutual capacitance that is unaffected by a touch event (i.e. near field lines 510), and instead rely as much as possible on the mutual capacitance that is changed by the touch event (i.e. far field lines 512).

FIG. 5b illustrates an example with ground guard 500. As FIG. 5b illustrates, ground guard 500 can reduce the undesirable mutual capacitance between the drive and sense lines by shunting most near field lines 510 directly to ground instead of allowing them to couple to sense line 504, leaving mostly far field lines 512 affected by touch events. With mostly far field lines 512 affecting the mutual capacitance value, the change in capacitance during a touch event can approach 50% as discussed above, which represents an improved SNR.

Figure 5C:
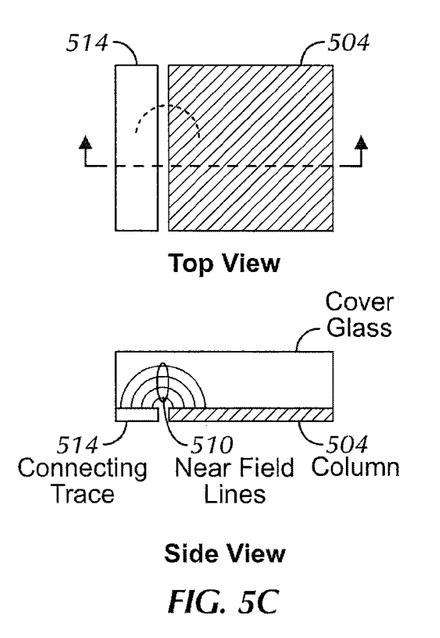
FIG. 5c and 5d illustrate top and side views of the effect of an exemplary ground guard on electric field lines emanating from a connecting trace according to embodiments of the invention.
Figure 5D:
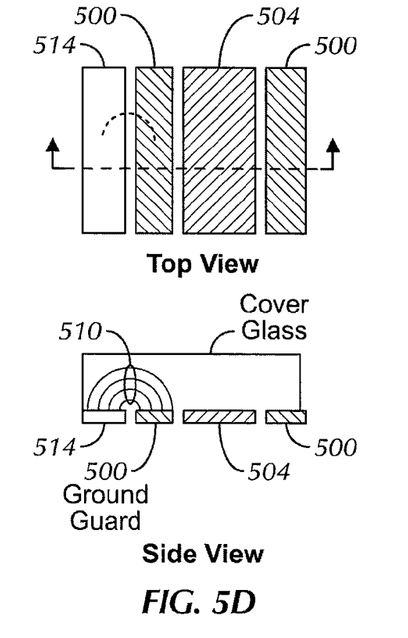

FIG. 5c and 5d illustrate top and side views of the effect of exemplary ground guard 500 on connecting trace 514 according to embodiments of the invention. FIG. 5c illustrates an example without a ground guard. Because connecting trace 514 can be coupled to a polygonal conductive area, it too can be driven with a stimulation signal. Without a ground guard, as illustrated in FIG. 5c, near field lines 510 can couple onto adjacent sense line 504, causing unintended changes in capacitance on the sense line. However, with a ground guard 500 in place as shown in FIG. 5d, near field lines 510 can be shunted to the ground guard instead of sense line 504, decreasing the unintended change in capacitance on the sense line.

Figure 5E:
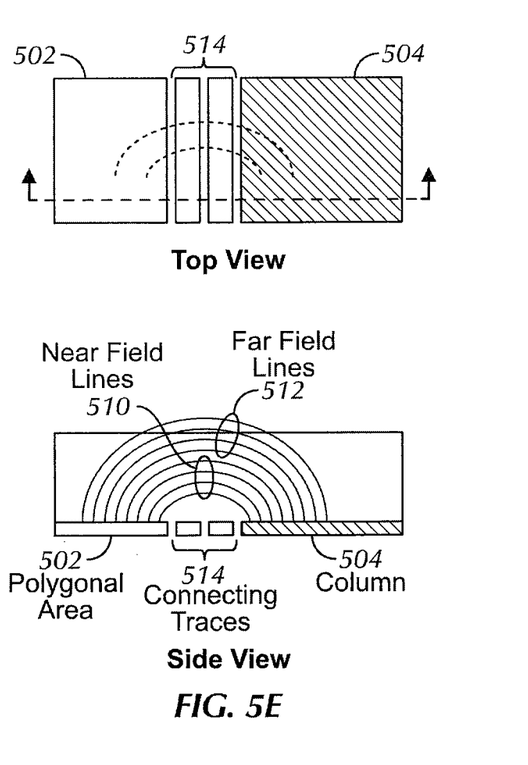
FIG. 5e and 5f illustrate top and side views of the effect of an exemplary ground guard on electric field lines emanating from a polygonal conductive area and separated from a sense line by connecting traces according to embodiments of the invention.
Figure 5F:
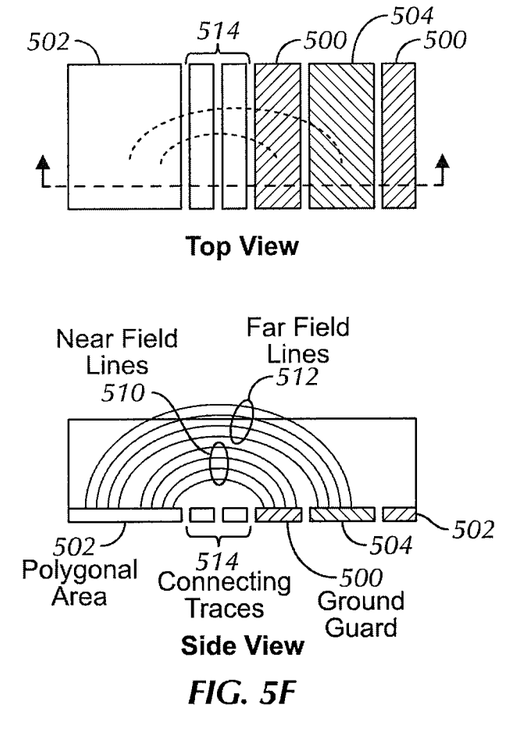

FIG. 5e and 5f illustrate top and side views of the effect of exemplary ground guard 500 on polygonal conductive area 502 separated from sense line 504 by connecting traces 514 according to embodiments of the invention. Without a ground guard, as illustrated in FIG. 5e, near field lines 510 can couple onto sense line 504, reducing the percentage change in capacitance on the sense line when a touch event occurs. However, with a ground guard 500 in place as shown in FIG. 5f, near field lines 510 can be shunted to the ground guard instead of sense line 504, leaving mostly far field lines 512 affected by touch events, increasing the percentage change in capacitance on the sense line when a touch event occurs.

Referring again to FIG. 1a, the previously mentioned ground isolation bars can minimize the amount of stray capacitance, Csig, between the connecting traces and the sense lines. Nevertheless, for the very longest routing traces, there can still be on the order of about 6 pF of Csig transferred from the connecting traces to the sense lines, which can reduce the dynamic range budget and can make calibration difficult. Because the stray capacitance from the connecting traces to sense lines is somewhat affected by a touch event, it can causes spatial cross-coupling in which a touch event in one region of the touch sensor panel additionally causes a decrease in the stray capacitance and an apparent (but false) touch event in remote areas of the panel.

Figure 6:
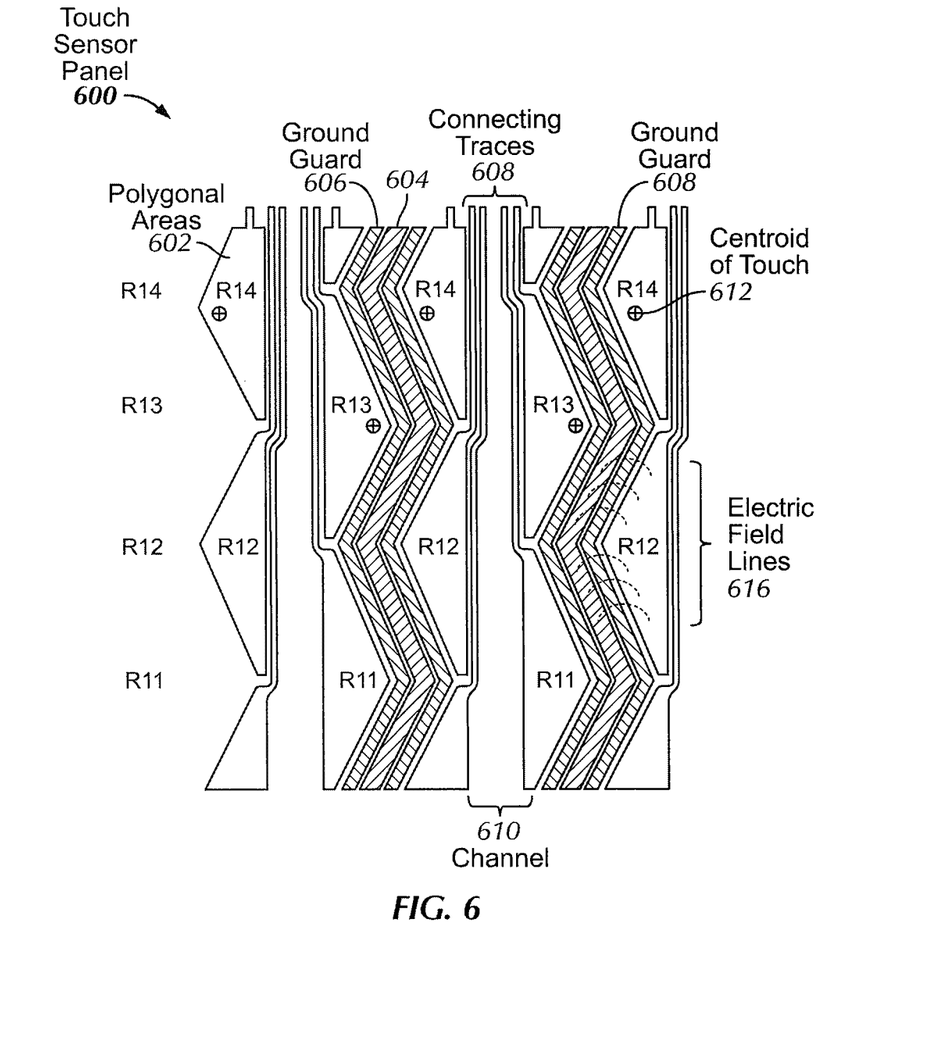
FIG. 6 illustrates a portion of an exemplary zig-zag double interpolated touch sensor panel that can further reduce the stray capacitance between the connecting traces and the columns according to embodiments of the invention.

FIG. 6 illustrates a portion of exemplary zig-zag double interpolated touch sensor panel 600 that can further reduce the stray capacitance between the connecting traces and the sense lines according to embodiments of the invention. In the example of FIG. 6, polygonal areas 602 representing the drive (or sense) lines are generally pentagonal in shape and staggered in orientation, with some of the bricks near the end of the panel being cut-off pentagons. Sense (or drive) lines 604 are zig-zag shaped, with ground guards 606 between the sense (or drive) lines and pentagons 602. All connecting traces 608 are routed in channels 610 between pentagons 602. In mutual capacitance embodiments, each pixel or sensor is characterized by electric field lines 616 formed between a pentagon and an adjacent sense (or drive) line 604. Because connecting traces 608 do not run alongside any sense (or drive) lines 604, but instead run between pentagons 602, the stray capacitance between connecting traces 608 and sense (or drive) lines 604 is minimized, and spatial cross-coupling is also minimized. Previously, the distance between connecting traces 608 and sense (or drive) lines 604 was only the width of ground guard 606, but in the embodiment of FIG. 6, the distance is the width of the ground guard plus the width of pentagon 602 (which varies along the length of its shape).

As the example of FIG. 6 indicates, the pentagons for row R14 at an end of the touch sensor panel can be truncated. Accordingly, the calculated centroids of touch 612 for R14 can be offset in the y-direction from their true position. In addition, the calculated centroids of touch for any two adjacent rows will be staggered (offset from each other) in the x-direction by an offset distance. However, this misalignment can be de-warped in a software algorithm to re-map the pixels and remove the distortion.

Although embodiments of the invention have been primarily described herein in terms of mutual capacitance touch sensor panels, it should be understood that embodiments of the invention are also applicable to self-capacitance touch sensor panels. In such an embodiment, a reference ground plane can be formed either on the back side of the substrate, or on the same side of the substrate as the polygonal areas and sense lines but separated from the polygonal areas and sense lines by a dielectric, or on a separate substrate. In a self-capacitance touch sensor panel, each pixel or sensor has a self-capacitance to the reference ground that can be changed due to the presence of a finger.

Figure 7:
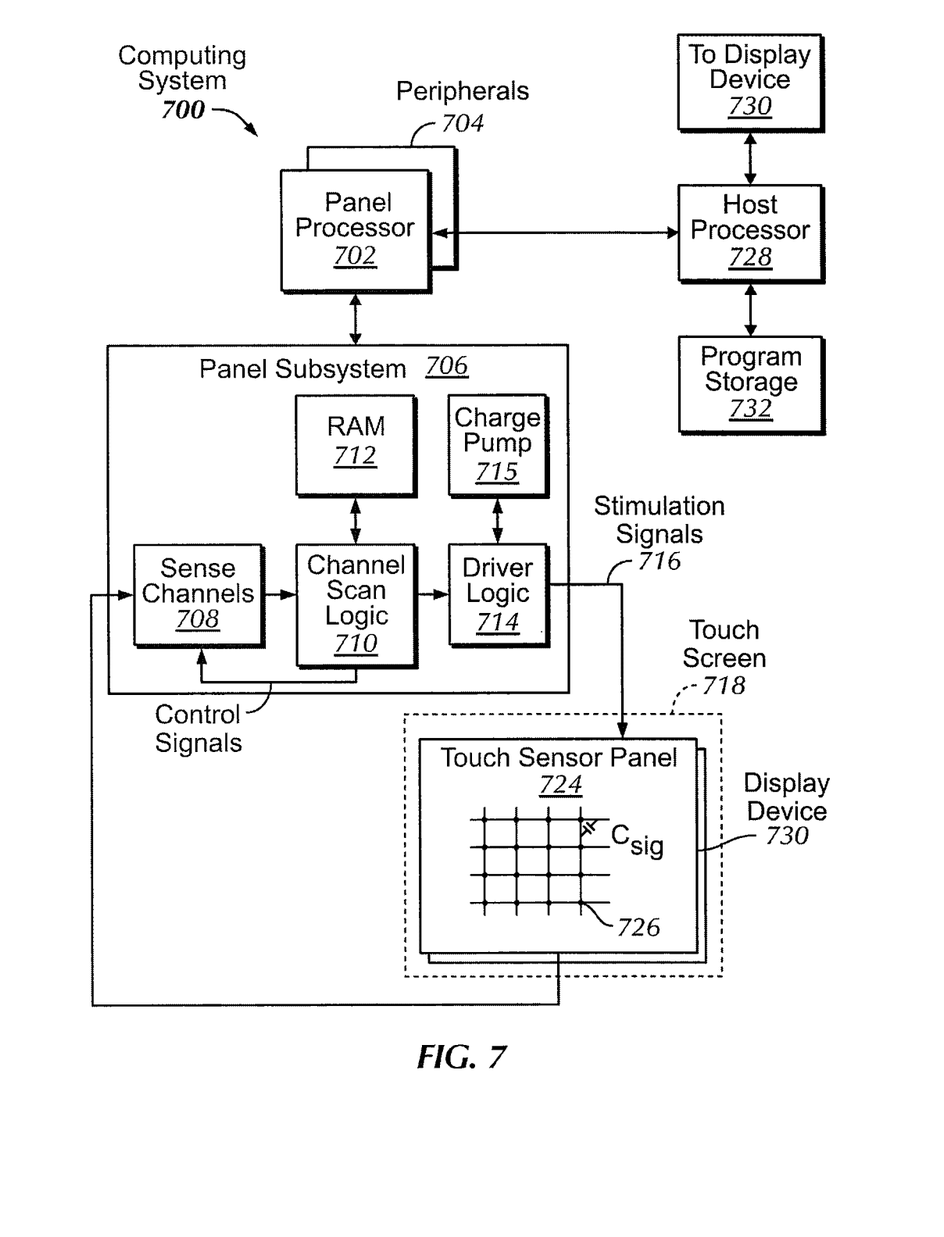
FIG. 7 illustrates an exemplary computing system operable with the touch sensor panel according to embodiments of this invention.

FIG. 7 illustrates exemplary computing system 700 that can include one or more of the embodiments of the invention described above. Computing system 700 can include one or more panel processors 702 and peripherals 704, and panel subsystem 706. Peripherals 704 can include, but are not limited to, random access memory (RAM) or other types of memory or storage, watchdog timers and the like. Panel subsystem 706 can include, but is not limited to, one or more sense channels 708, channel scan logic 710 and driver logic 714. Channel scan logic 710 can access RAM 712, autonomously read data from the sense channels and provide control for the sense channels. In addition, channel scan logic 710 can control driver logic 714 to generate stimulation signals 716 at various frequencies and phases that can be selectively applied to drive lines of touch sensor panel 724. In some embodiments, panel subsystem 706, panel processor 702 and peripherals 704 can be integrated into a single application specific integrated circuit (ASIC).

Touch sensor panel 724 can include a capacitive sensing medium having a plurality of drive lines and a plurality of sense lines, although other sensing media can also be used. In mutual capacitance embodiments, each intersection of drive and sense lines can represent a capacitive sensing node and can be viewed as picture element (pixel) 726, which can be particularly useful when touch sensor panel 724 is viewed as capturing an "image" of touch. (In other words, after panel subsystem 706 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) Each sense line of touch sensor panel 724 can be coupled to a sense channel 708 (also referred to herein as an event detection and demodulation circuit) in panel subsystem 706.

Computing system 700 can also include host processor 728 for receiving outputs from panel processor 702 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 728 can also perform additional functions that may not be related to panel processing, and can be coupled to program storage 732 and display device 730 such as an LCD display for providing a UI to a user of the device. Display device 730 together with touch sensor panel 724, when located partially or entirely under the touch sensor panel, can form touch screen 718.

Note that one or more of the functions described above can be performed by firmware stored in memory (e.g. one of the peripherals 704 in FIG. 7) and executed by panel processor 702, or stored in program storage 732 and executed by host processor 728. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 8A:
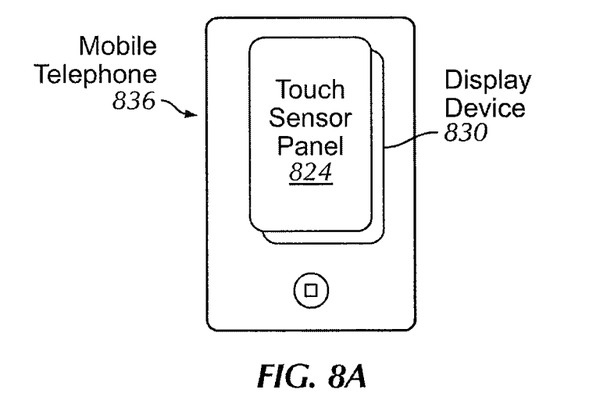
FIG. 8a illustrates an exemplary mobile telephone that can include the touch sensor panel according to embodiments of the invention.

FIG. 8*a* illustrates exemplary mobile telephone 836 that can include touch sensor panel 824 and display device 830, the touch sensor panel having rows and columns formed as described above according to embodiments of the invention.

Figure 8B:
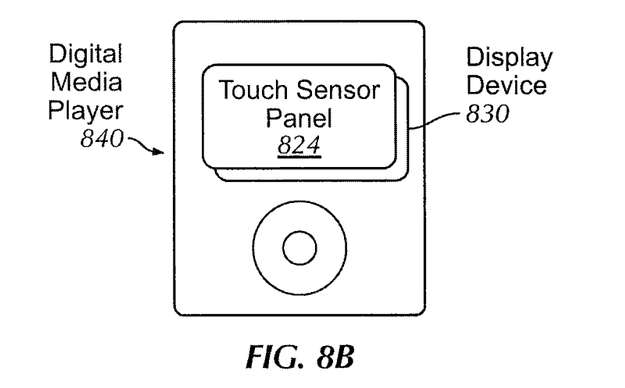
FIG. 8b illustrates an exemplary media player that can include the touch sensor panel according to embodiments of the invention.

FIG. 8*b* illustrates exemplary digital media player 840 that can include touch sensor panel 824 and display device 830, the touch sensor panel having rows and columns formed as described above according to embodiments of the invention.

The mobile telephone and media player of FIGS. 8*a* and 8*b* can advantageously benefit from the touch sensor panel described above because the touch sensor panel can enable these devices to be more touch sensitive, thinner and less expensive, which are important consumer factors that can have a significant effect on consumer desirability and commercial success.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A capacitive touch sensor panel, comprising:
a plurality of sense lines formed on a single layer and supported on one side of a substrate;
a plurality of drive lines formed on the same side of the substrate as the plurality of sense lines, each of the plurality of drive lines formed along rows from a corresponding plurality of polygonal areas electrically coupled together by a plurality of traces routed to a plurality of bus lines including at least a first and second bus line, the plurality of sense lines formed of a plurality of columns, the plurality of sense lines and the plurality of drive lines forming an array of capacitive sensors;
one or more ground guards formed adjacent to one or more of the sense lines for shunting electric field lines that would otherwise couple capacitance onto the one or more sense lines;
the plurality of connecting traces routed adjacent to at least a first and second column of the polygonal areas, each column having at least a first and second polygonal area disposed in the same position in each column relative to the plurality of bus lines, the distance between the first polygonal area and the bus lines being different from the distance between the second polygonal area and the bus lines;
the plurality of connecting traces formed on the same side of the substrate as the plurality of sense lines;
a first connecting trace coupling the first bus line to the first polygonal area of the first column and a second connecting trace coupling the first bus line to the second polygonal area of the second column; and
a third connecting trace coupling the second bus line to the second polygonal area of the first column, and fourth connecting trace coupling the second bus line to the first polygonal area of the second column;
whereby at least the first and second bus lines have a substantially uniform average impedance.

2. The touch sensor panel of claim 1, the one or more ground guards configured for shunting near-field electric field lines that would otherwise couple capacitance onto the sense lines.

3. The touch sensor panel as recited in claim 1 wherein the traces are connected to the polygonal areas and the bus lines so as to interleave the polygonal areas.

4. The touch sensor panel of claim 1, the one or more ground guards formed between one or more of the polygonal areas and the one or more sense lines for shunting electric field lines from the one or more polygonal areas.

5. The touch sensor panel of claim 1, the touch sensor panel integrated within a computing system.

6. The touch sensor panel of claim 5, computing system integrated within a mobile telephone.

7. The touch sensor panel of claim 5, the computing system integrated within a media player.

8. A method for improving a touch detection capability of a capacitive touch sensor panel having a plurality of drive lines and a plurality of sense lines formed on a same side of a single substrate, comprising:
- forming the plurality of drive lines from a plurality of polygonal areas electrically coupled together by a plurality of traces routed to a plurality of bus lines including at least a first and second bus line;
- forming the plurality of sense lines as a plurality of columns;
- routing the plurality of connecting traces adjacent to the polygonal areas on the same side of the substrate as the plurality of sense lines;
- routing the plurality of connecting traces adjacent to at least a first and second column of the polygonal areas, each column having at least a first and second polygonal area disposed in the same position in each column relative to the plurality of bus lines, the distance between the first polygonal area and the bus lines being different from the distance between the second polygonal area and the bus lines; and
- a first connecting trace coupling the first bus line to the first polygonal area of the first column and a second connecting trace coupling the first bus line to the second polygonal area of the second column;
- a third connecting trace coupling the second bus line to the second polygonal area of the first column, and fourth connecting trace coupling the second bus line to the first polygonal area of the second column; and
- forming the one or more ground guards adjacent one or more sense lines for shunting electric field lines that would otherwise couple capacitance onto the one or more sense lines;
- whereby at least the first and second bus lines have a substantially uniform average impedance.

9. The method of claim 8, further comprising configuring the one or more ground guards for shunting near-field electric field lines.

10. The method of claim 8, further comprising forming the one or more ground guards between the polygonal areas and the sense lines for shunting electric field lines from the polygonal areas.

11. A mobile telephone including a touch sensor panel, the touch sensor panel comprising:
- a plurality of sense lines formed on a single layer and supported on one side of a substrate;
- a plurality of drive lines formed on the same side of the substrate as the plurality of sense lines, each of the plurality of drive lines formed along rows from a corresponding plurality of polygonal areas electrically coupled together by a plurality of traces routed to a plurality of bus lines, including at least a first and second bus line, the plurality of sense lines formed of a plurality of columns, the plurality of sense lines and the plurality of drive lines forming an array of capacitive sensors;
- one or more ground guards formed adjacent to one or more of the sense lines for shunting electric field lines that would otherwise couple capacitance onto the one or more sense lines;
- the plurality of connecting traces routed adjacent to at least a first and second column of the polygonal areas, each column having at least a first and second polygonal area disposed in the same position in each column relative to the plurality of bus lines, the distance between the first polygonal area and the bus lines being different from the distance between the second polygonal area and the bus lines;
- the plurality of connecting traces formed on the same side of the substrate as the plurality of sense lines;
- a first connecting trace coupling the first bus line to the first polygonal area of the first column and a second connecting trace coupling the first bus line to the second polygonal area of the second column; and
- a third connecting trace coupling the second bus line to the second polygonal area of the first column, and fourth connecting trace coupling the second bus line to the first polygonal area of the second column;
- whereby at least the first and second bus lines have a substantially uniform average impedance.

12. A media player including a touch sensor panel, the touch sensor panel comprising:
- a plurality of sense lines formed on a single layer and supported on one side of a substrate;
- a plurality of drive lines formed on the same side of the substrate as the plurality of sense lines, each of the plurality of drive lines formed along rows from a corresponding plurality of polygonal areas electrically coupled together by a plurality of traces routed to a plurality of bus lines, including at least a first and second bus line, the plurality of sense lines formed of a plurality of columns, the plurality of sense lines and the plurality of drive lines forming an array of capacitive sensors;
- one or more ground guards formed adjacent to one or more of the sense lines for shunting electric field lines that would otherwise couple capacitance onto the one or more sense lines;
- the plurality of connecting traces routed adjacent to at least a first and second column of the polygonal areas, each column having at least a first and second polygonal area disposed in the same position in each column relative to the plurality of bus lines, the distance between the first polygonal area and the bus lines being different from the distance between the second polygonal area and the bus lines;
- the plurality of connecting traces formed on the same side of the substrate as the plurality of sense lines;
- a first connecting trace coupling the first bus line to the first polygonal area of the first column and a second connecting trace coupling the first bus line to the second polygonal area of the second column; and
- a third connecting trace coupling the second bus line to the second polygonal area of the first column, and fourth connecting trace coupling the second bus line to the first polygonal area of the second column;
- whereby at least the first and second bus lines have a substantially uniform average impedance.

* * * * *